April 24, 1956 L. T. ASKREN ET AL 2,742,793
TWO-SPEED DRIVE ARRANGEMENT
Filed Jan. 28, 1954 2 Sheets-Sheet 1

LEE T. ASKREN
WALTER E. TAYLOR
INVENTORS

BY

ATTORNEYS

April 24, 1956  L. T. ASKREN ET AL  2,742,793
TWO-SPEED DRIVE ARRANGEMENT
Filed Jan. 28, 1954  2 Sheets-Sheet 2

LEE T. ASKREN
WALTER E. TAYLOR
INVENTORS

BY
ATTORNEYS

United States Patent Office 2,742,793
Patented Apr. 24, 1956

2,742,793

TWO-SPEED DRIVE ARRANGEMENT

Lee T. Askren and Walter E. Taylor, Rochester, N. Y., assignors to Eastman Kodak Company, Rochester, N. Y., a corporation of New Jersey Application January 28, 1954, Serial No. 406,694

9 Claims. (Cl. 74—217)

In moving picture projectors, different speeds of operation are customarily required, depending upon whether the film being projected has a sound track or is of the silent type. Thus, for sound pictures, a projection speed of 24 frames a second is customarily employed, whereas for silent film a rate of 16 frames a second is used. Moreover it is frequently desired to operate such projectors in a reversed direction, especially when unusual effects are desired. This imposes a rather severe requirement in the design of such a device, since the drive mechanism must be not only capable of operation in either direction at either of two definite speeds, but must, at the same time require but few relatively simple, inexpensive, and substantially "foolproof" parts.

It is an object of this invention to provide such a drive arrangement which is capable of providing two speeds of operation in either direction and yet which is relatively simple and easy to manufacture.

A further object is to provide a two-speed pulley in which the belt may selectively run in either of two different diameter belt grooves and in which the shifting from one groove to the other may be done at will, regardless of the direction of operation of rotation of the pulley at that time.

A further object is to provide a two-speed pulley having two belt grooves of different diameter and wherein the belt is retained in substantially the same plane, both while engaged in either of the two grooves as well as during the actual speed changing operation.

Still another object is to provide a two-speed pulley in which the belt shifting means is incorporated within the pulley itself so that it will be equally effective regardless of the direction of rotation of the pulley.

Another object is to provide a belt-shifting, two-speed pulley which is exceptionally silent in operation.

Further objects will become apparent from the following specification and claims, especially when considered in the light of the accompanying drawing.

In the drawing, Fig. 1 is a fragmentary elevational view of a moving picture projector incorporating our novel driving mechanism.

Figure 3:
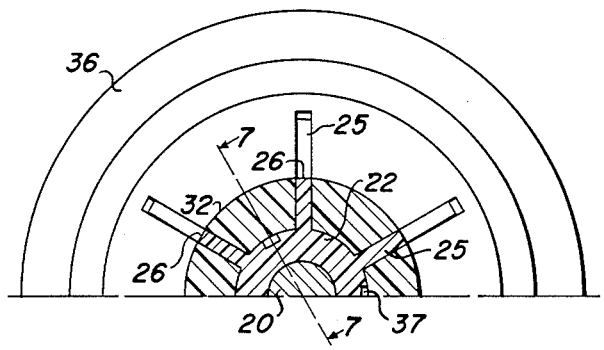
Fig. 3 is a fragmentary sectional view through the drive pulley, the plane of the section being indicated by the line 3—3 in Fig. 4.
Figure 4:
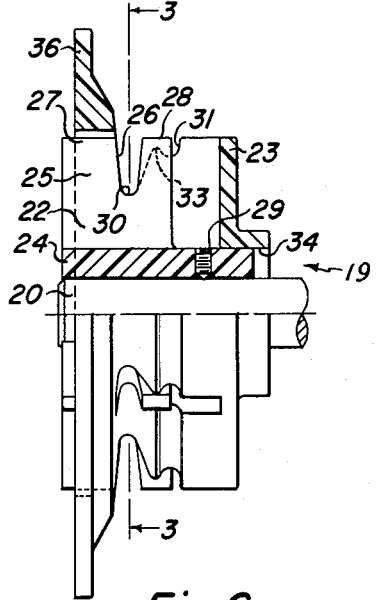
Fig. 4 is a side view of the pulley, with parts broken away better to show the interior, and with the pulley in the low-speed drive condition.
Figure 5:
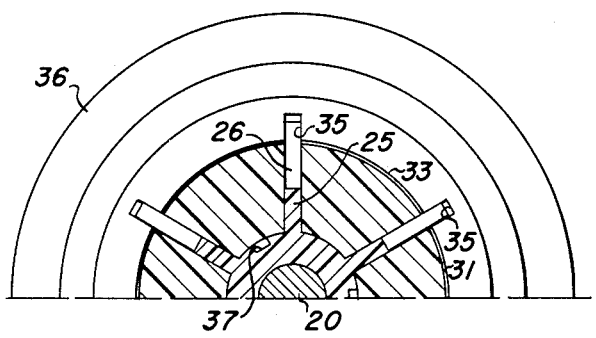
Figure 6:
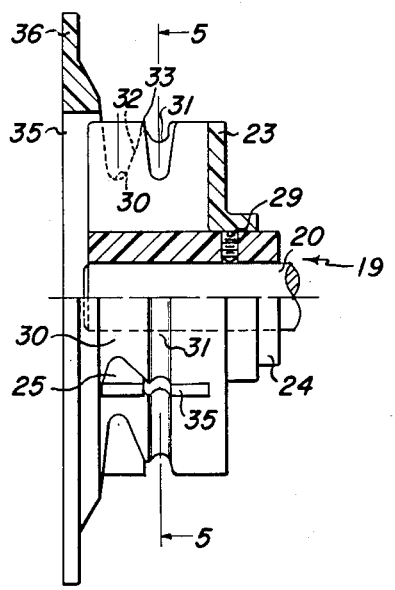

Figs. 5 and 6 are views corresponding to Figs. 3 and 4 but showing the parts arrangement for high-speed driving operation, Fig. 5 being a fragmentary sectional view taken on the line 5—5 in Fig. 6.

Figure 7:
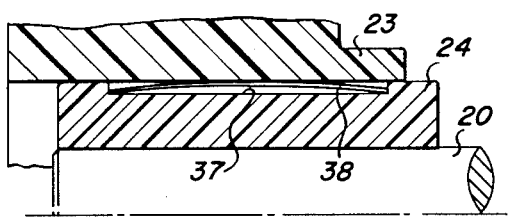

Fig. 7 is a fragmentary section taken on line 7—7 of Fig. 3.

Figure 1:
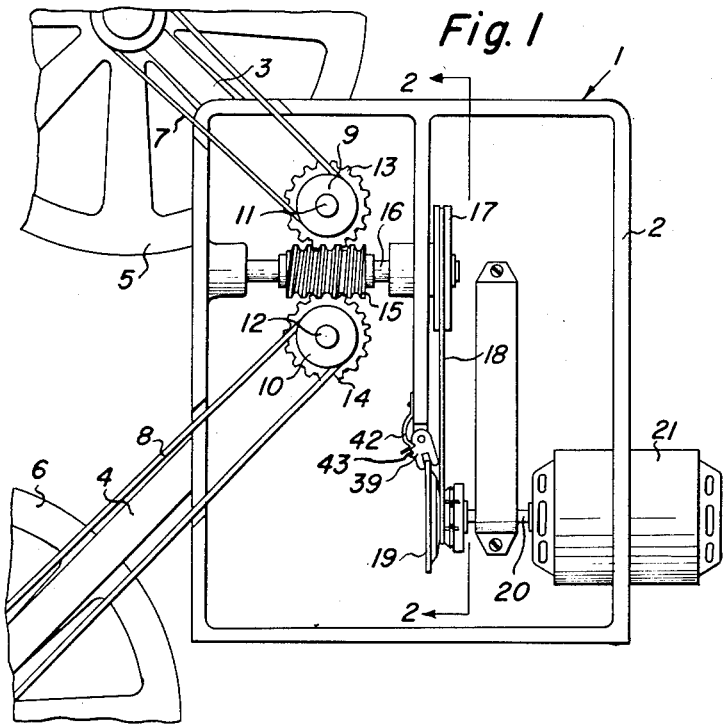

Fig. 1 shows a moving picture projector 1 incorporating our novel driving arrangement. Projector 1 comprises a frame or housing 2, carrying the usual reel arms 3 and 4 which in turn rotatably carry the supply and take-up reels 5 and 6. As is usual in such projectors, reels 5 and 6 are driven by a belt and pulley arrangement including drive belts 7 and 8 which are driven by pulleys 9 and 10 carried on a pair of mechanism drive shafts 11 and 12 suitably journaled in the housing 2. Shafts 11 and 12 also carry worm gears 13 and 14 which engage a worm 15 carried on a driven jack shaft 16, also rotatably carried on the housing 2 and having at its inner end a pulley 17. A flexible belt 18 passes around pulley 17 and a driving pulley 19 carried by the shaft 20 of the usual drive motor 21.

Drive pulley 19, is a stepped pulley incorporating shifting mechanism for effectively shifting the belt 18 from a low speed to a high speed groove or vice versa. Turning now to Figs. 3 through 7, the pulley 19 is seen to comprise two major parts 22 and 23. The first part 22 comprises a generally cylindrical hub 24 rigidly mounted on the drive shaft 20 and provided with a plurality of generally radially extending vanes 25 arranged in angularly spaced relationship about the periphery of the hub 24. The outer end portion of each of these vanes is provided with a relatively deep belt-retaining notch 26. It can be seen, therefore, that each of these vanes 25 forms, in effect, a pair of axially spaced, generally radially extending arms 27 and 28, and that these pairs of arms collectively define a peripheral belt-retaining groove therebetween. As will be later explained these arms serve to maintain the drive belt 18 at all times in substantially the same plane, so that it is always properly aligned with the groove on driven pulley 17. Member 22 may be rigidly secured to the shaft 20 by any conventional means, a suitable set screw 29 in the hub 24 being shown as used for this purpose.

The second major part of the drive pulley 23 is in the form of a stepped pulley drum, the outer peripheral surface of which is provided with a small diameter, belt-receiving groove 30 for low-speed operation and a second, larger diameter, belt-receiving groove 31, the plane of which is displaced axially from that of groove 30. The peripheral wall between groove 30 and 31 is in the form of a generally conical surface 32 along which the belt 18 may climb in passing from the smaller groove 30 to the larger groove 31. As is clear in Figs. 4 and 6 climbing surface 32 blends with the smaller groove 30 so as to be substantially tangent thereto, and extends outwardly to a point somewhat beyond the bottom of the groove 31 so as to form a relatively low belt retaining ridge 33 along the adjacent edge thereof and of sufficient height to normally retain a belt within the groove 31. Pulley drum 23 is provided with a central cylindrical bore 34 adapted to slidably receive the hub 24 of member 22 and is further provided with a plurality of generally radially extending slots 35 for the reception of vanes 25. Slots 35 open through the outer peripheral surface of the member 23, traversing the grooves 30 and 31, and also open through one face, shown as the left hand face in Fig. 4, of the member 23.

Figure 2:
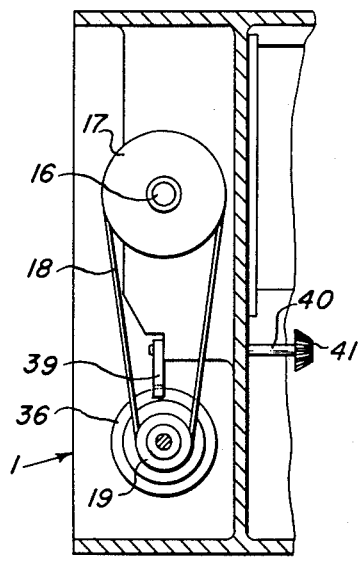
Fig. 2 is a section taken in the plane indicated by the line 2—2 in Fig. 1.

The left hand end of the pulley drum 23 is also provided with an outwardly extending flange 36 which, as shown in Figs. 1 and 2 is adapted to be engaged by a suitable shifting fork 39 for shifting the pulley drum axially relative to the member 22. Shifting fork 39 may conveniently be carried on one end of a manually actuated shaft 40 provided with a suitable knob 41 and extending through the frame from the operator's side of the projector. A suitable detent spring 42 coacts with one or the other of a pair of notches 43 on the fork 39 to normally hold the shifting fork in either the high or low speed position. Notches 43 are so located as to hold the fork out of contact with the sides of flange 36 except during the actual shifting operation.

Both the members 22 and 23 may conveniently be molded from nylon which has been found especially well adapted for this purpose. However, due to the inevitable manufacturing tolerances there will normally be a slight amount of "play" between the two parts 22 and 23. While, in certain fields of application this "play" would have no particular significance, in the case of a movie projector it may well result in the development of an objectionably large amount of noise due to the resulting slight relative movements of the parts with respect to one another as the pulley rotates. To eliminate this source of possible noise, hub 24 is provided with a plurality of longitudinally extending slots 37 on its outer periphery. Inserted in each of these slots is a resilient member 38, shown in the form of bowed leaf spring, which is adapted to act radially outwardly against the opposing wall of the bore 34 in the drum member 23. This arrangement has been found to be extremely effective in eliminating any undesirable noise during the operation of the pulley.

As is best seen in Figs. 4 and 6 the plane of symmetry of the belt retaining groove defined collectively by the notches 26 in the vanes 25 normally is aligned with the center of one or the other of the belt grooves 30 and 31. Moreover, the depth of these notches 26 is preferably such that, when the member 23 is shifted into the low-speed position shown in Fig. 4 the bottom walls of the notches will be in alignment with, and will in effect form continuations of, the groove 30 so that during the low-speed operation, all portions of the belt wrapped around the pulley will be in frictional engagement with the surface thereof. When the pulley drum 23 has been shifted to the high-speed position shown in Fig. 6, the belt will also be in frictional driving contact with the pulley groove throughout almost its entire peripheral run. The only gaps in the contacting surface will be those produced by the slots 35, as shown in Fig. 5, and the relative angular width of these slots is so small compared to the angular extent of the remainder of the periphery of the drum, that no undue amount of noise or vibration is produced thereby.

It should be noted that the opposed walls of the notches 26 diverge slightly. In practice, it is found that an included angle between these walls of substantially 10° is sufficient to permit ready reception of the belt therein as it passes onto the drum, while at the same time the walls are sufficiently close to the perpendicular that it is practically impossible for the belt to climb up along one of these walls. On the other hand, the conical climbing surface 32 has a much more gradual slope, producing in effect a surface inclining about 20° from a plane perpendicular to the axis of the shaft. It has been found that a round belt of the type intended to be used with such a pulley will readily climb up such an incline from the smaller diameter groove to the larger diameter. Furthermore, when the drum is shifted to the left as in Fig. 6 so that the belt is riding in the high speed or large diameter groove 31 it will be retained therein by means of the relatively low ridge 33 which serves as the one side wall of this groove, and therefore no external force need be applied to the drum to hold it in this position. Furthermore any tendency of the belt to move to an appreciable extent to either side would be opposed by the engagement of the side of the belt with the side wall of the notches 26 in the fixed member 22 which serve to establish the plane of operation of the belt. Belt 18 is preferably somewhat elastic so that it will automatically accommodate its length to compensate for the difference in diameter of the two grooves on the stepped pulley although, if desired, a fixed-length belt and suitable take up idler could obviously be used.

The operation of this driving arrangement is believed to be apparent from the above description. If, for example, the pulley is in its low-speed position as indicated in Fig. 1 it can readily be shifted to high-speed position, while the motor 21 is being operated in either direction, by the simple expedient of turning knob 41 so as to swing shifting fork 39 clockwise. The bifurcated shifting fork will thereupon apply a force acting to the left against the flange 36 of the stepped pulley drum 23 causing the climbing surface 32 thereof to move against the side of the belt. Since the belt is restrained against movement to the left by the walls of the notches 26, it will thereupon rapidly climb up the conical surface 32 and into driving position in the high-speed groove 31. As previously stated the detent spring 42 will thereupon snap into engagement with the appropriate notch 43 on the shifting fork 39 so as to maintain the fork in such position that it will straddle the flange 36 without actually contacting it.

With a pulley of this type, we have found that so long as the shifting fork is arranged so as to act upon that peripheral portion of the pulley drum which is between the two shafts and generally in the plane through their axis, very little force is required to cause the belt to be shifted from one groove to the other regardless of the direction of operation. On the other hand, if the shifting fork were located so as to act on the lower part of the pulley, a much larger force would be required to shift the belt. This apparently is due to the fact that the slight amount of play between the parts, which is inherently present due to the usual manufacturing tolerances involved, permits a slight cocking of the pulley drum on the hub 24 during the shifting operation and, when the force is applied to the upper portion of the pulley flange, the direction of this cocking is such as to assist the belt climbing action whereas when the force is applied below the pulley the cocking of the pulley drum tends to oppose such action.

As will be understood by those skilled in the art, no attempt has been made to show all of the driving mechanism customarily used with such a projector, only that for driving the take-up and supply reels having been illustrated. The usual film feeding sprockets (not shown) would of course also be present in an actual projector, and, like the reels, would be driven in timed relationship with shafts 11 and 12.

While in the instant device the variable speed pulley is arranged to provide but two speeds of operation, it is obvious that the same principles could be applied to the design of a pulley having more than two belt-receiving grooves. Obviously, too, other arrangements could be used for providing the pairs of axially spaced arms 27 and 28 on the shaft 20, although the arrangement illustrated, wherein these arms are formed by the notched ends of a plurality of vane members has been found to be very effective.

Many other changes could obviously be made, as will be apparent to those skilled in the art, without departing from the spirit and scope of this invention as defined by the appended claims.

We claim:

1. In a two-speed, reversible drive system for a moving picture projector having a driving shaft, a driven shaft and a belt and pulley system drivingly interconnecting said shafts, including a stepped pulley on one of said shafts and a belt engaging said pulley, the improvement wherein said stepped pulley comprises a stepped pulley drum mounted for axial shifting movement on said one shaft and provided with a pair of axially spaced, peripheral, belt-receiving grooves on the outer peripheral surface thereof and a generally conical, belt-climbing surface between said grooves, and belt retaining means rigidly carried by said one shaft and extending outwardly therefrom alongside said belt beyond the grooved peripheral surface of said drum, said belt retaining means being arranged to prevent substantial axial shifting of said belt upon axial shifting of said pulley drum.

2. In a drive system as set forth in claim 1, shifting means for applying an axial force to the pulley drum for shifting it in either direction, said shifting means being positioned so as to engage said drum at a point displaced radially from the axis thereof and toward said other shaft and lying in a plane substantially midway between the runs of the belt passing onto and off from said steped pulley.

3. In a variable-speed belt drive system, a shaft, a stepped pulley drum carried by said shaft for axial shifting movement relative thereto and provided with a pair of axially spaced, peripheral belt-receiving grooves of different diameter and a generally conical surface therebetween, and belt retaining means carried by said shaft and constrained against axial movement relative thereto, said means being arranged to extend outwardly beyond the periphery of said pulley drum adjacent said grooves to prevent substantial axial movement of a belt engaging said pulley, whereby upon axial shifting of said pulley drum said belt will be caused to shift from one groove to the other.

4. In a variable-speed belt drive system, a shaft, a generally cylindrical hub member fixed to said shaft for rotation therewith, said hub member being provided with a plurality of angularly spaced vanes extending radially outwardly from the periphery thereof, a shiftable pulley drum having a central bore extending axially therethrough and provided with a plurality of radially extending slots opening through one end wall and the periphery of said shiftable drum and adapted to slidably receive said vanes whereby said drum is axially shiftable relative to said hub member, the outer surface of said pulley drum being formed to provide a pair of axially spaced, peripheral, belt-receiving grooves and a substantially conical surface extending between said grooves, said conical surface being substantially tangent to the smaller diameter groove and extending generally radially outwardly to a point slightly beyond the bottom of the larger diameter groove, said vanes extending outwardly to a point beyond the maximum diameter of the peripheral portion of said pulley member between said grooves and having notches extending radially inwardly toward the axis from the outer ends thereof, the radial depth of said notches being such that the diameter of the circle described by the bottom thereof will be no greater than that of the smaller diameter groove.

5. In a variable-speed belt drive system, a shaft, a stepped pulley drum carried by said shaft for axial shifting movement relative thereto and having its outer peripheral surface formed to provide a pair of axially spaced, peripheral, belt-receiving grooves of different diameter, said pulley drum being provided with a plurality of angularly spaced slots opening outwardly through the grooved portion thereof, and belt-retaining means rigidly carried by said shaft and extending outwardly through said slots beyond said grooved peripheral portion of the drum into position to engage the sides of a belt passing around said drum to prevent substantial axial displacement thereof upon axial shifting of said drum.

6. In a variable-speed pulley, a first member adapted for rotation about a predetermined axis and including a plurality of angularly-spaced arms extending generally radially outwardly from said axis for retaining a belt substantially in a given transverse plane relative thereto, a second member mounted for axial shifting movement relative to said first member and provided with a plurality of slots opening through the outer peripheral wall thereof and slidably receiving said arms, said peripheral wall of said second member being formed to provide a plurality of axially spaced belt-receiving grooves of different diameter, and the outer ends of said arms extending outwardly beyond the grooved peripheral portion of said second member.

7. In a variable-speed belt drive system, a rotatable shaft, a hub member rigidly secured to said shaft and a plurality of pairs of axially spaced arms extending generally radially outwardly from said hub member and spaced about the periphery thereof, said arms collectively defining a relatively steep-sided peripheral belt retaining groove therebetween, an axially shiftable pulley member having a central bore adapted to slidably receive said hub member and a plurality of slots extending radially outwardly from said bore and opening through one end wall and the outer peripheral surface of said pulley member and adapted to slidably receive said pairs of arms, said outer peripheral surface of said pulley member being formed to provide a pair of axially spaced belt-receiving grooves of different diameter either of which may be brought into alignment with the belt-retaining groove defined by said arms, and a substantially conical surface extending from adjacent the smaller diameter belt-receiving groove to adjacent the larger diameter belt-receiving groove, said arms having such length as to extend outwardly beyond all portions of the peripheral surface of said pulley member between said belt-receiving grooves.

8. In a variable-speed pulley, a first member adapted for rotation about a predetermined axis and including a generally cylindrical hub having a plurality of angularly spaced arms extending generally radially outwardly therefrom for retaining a belt substantially in a given transverse plane relative thereto, a second member mounted for axial shifting movement on said hub and provided with a plurality of slots opening through the outer peripheral wall thereof and slidably receiving said arms, the said outer peripheral wall of said second member being formed to provide a plurality of axially spaced, belt-receiving grooves of different diameter, the outer ends of said arms extending outwardly beyond the grooved peripheral portion of said second member, and a plurality of resilient members carried by said hub and spaced angularly about the periphery thereof and acting substantially radially outwardly against said second member.

9. A variable speed pulley comprising a pair of members nested together and arranged for conjoint rotation about a common axis and for relative axial shifting movement, the first of said members having its outer peripheral surface formed with a plurality of axially spaced, belt-receiving grooves of different diameter, and the second of said members being provided with belt-retaining means extending outwardly beyond the periphery of said first member adjacent said grooves and arranged to maintain a belt engaging said pulley in a predetermined axial position relative to said second member.

References Cited in the file of this patent
UNITED STATES PATENTS

| | | |
|---|---|---|
| 867,466 | Bailey | Oct. 1, 1907 |
| 1,363,471 | Kocourek | Dec. 28, 1920 |
| 1,388,449 | Brasseur | Aug. 23, 1921 |